Figure 1:
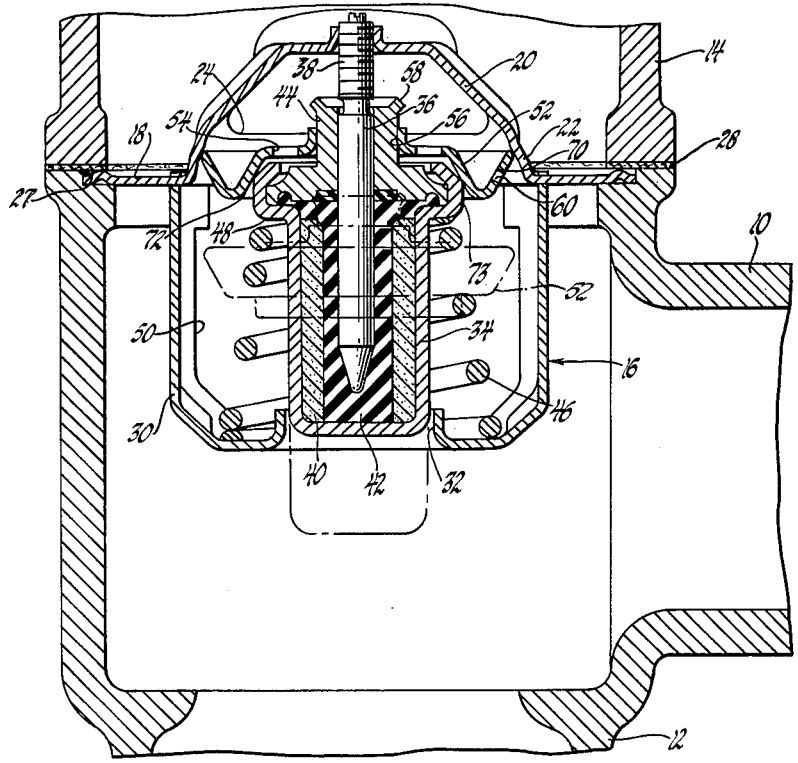

Sept. 21, 1965 C. S. BAILEY 3,207,437
TAPERED THROAT SECTION VALVE THERMOSTAT
Filed Feb. 28, 1963 2 Sheets-Sheet 1

INVENTOR.
Charles S. Bailey
BY
George E. Johnson
ATTORNEY

Sept. 21, 1965        C. S. BAILEY        3,207,437

TAPERED THROAT SECTION VALVE THERMOSTAT

Filed Feb. 28, 1963        2 Sheets-Sheet 2

INVENTOR.
Charles S. Bailey
BY George E. Johnson
ATTORNEY

United States Patent Office 3,207,437
Patented Sept. 21, 1965

3,207,437
TAPERED THROAT SECTION VALVE
THERMOSTAT
Charles S. Bailey, Lockport, N.Y., assignor to General Motors Corporation, Detroit, Mich., a corporation of Delaware
Filed Feb. 28, 1963, Ser. No. 261,807
3 Claims. (Cl. 236—34)

This is a continuation-in-part of application Serial No. 190,479, filed April 26, 1962, and now abandoned.

This invention relates to thermostats and more particularly to flow-control thermostats actuated by thermostatic motors and each employing at least one valve and these devices being particularly adapted for controlling engine coolant flow under pressure.

Thermostats such as disclosed in the United States Patent No. 2,881,616, granted April 14, 1959, in the names of H. J. Clifford and A. Schwarz operate satisfactorily but often "cycle" or "hunt" during the initial opening travel of the valve employed when opening to permit fluid flow as pump pressure on the underside of the valve tends to hold the valve closed. This tendency must be overcome by the thermostatic element in opening the valve and, as a result, opening is delayed. Engine thermostats function to determine an efficient engine temperature during low ambient temperatures and they should not interfere with coolant flow during high engine temperatures. Objectionable thermostat cycling depends primarily on the rate at which coolant flow increases as the coolant temperature increases above start-to-open temperature. If the coolant flow increases too rapidly, the thermostat admits too much coolant to the radiator. This excessive flow reduces the coolant temperature below start-to-open temperature and therefore causes the thermostat to close completely and setting the stage for another cycle of the thermostat operation. Any reduction in this tendency to cycle constitutes a welcome improvement.

An object of the present invention is to provide an improved thermostat in which hunting or cycling is minimized and which exhibits long-life effectiveness. Another object is to provide a thermostat in which opening of the valve employed may be smooth to give a metered effect in the throttling of fluid flow.

To these ends, a feature of the present invention is a thermostat having a tapered or frusto-conical wall defining a port in which an annular valve may be linearly moved to give a metering effect, the taper or the angularity of a main and annular portion of the wall with respect to the port axis or center line being acute and within a preferred range of fifteen to thirty degrees giving a throat width increasing as measured away from the valve seat and upstream from the port. Another feature is a thermostat having a frusto-conical surface facing a circular valve and arranged to provide a tapered throat with at least one portion of the surface having an angularity of from 5 to 15 degrees with the axis of the throat and cooperating with the valve to effect a metered flow through the thermostat. Another feature is an annular valve having coaxial inner and outer frusto-conical surfaces partially defining two throats each capable of effecting a metered flow with no or a minimum of cycling.

These and other important features of the invention will now be described in detail in the specification and then pointed out more particularly in the appended claims.

Figure 2:
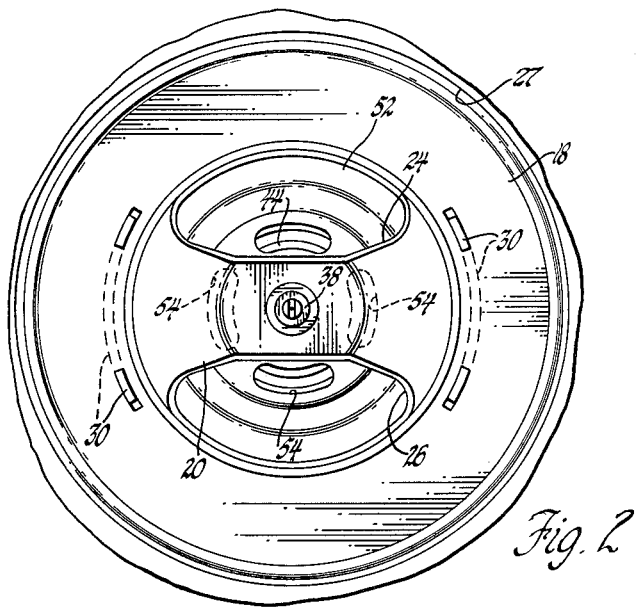
Figure 3:
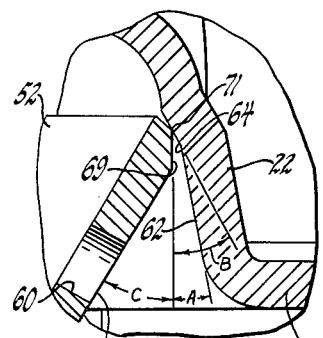
Figure 4:
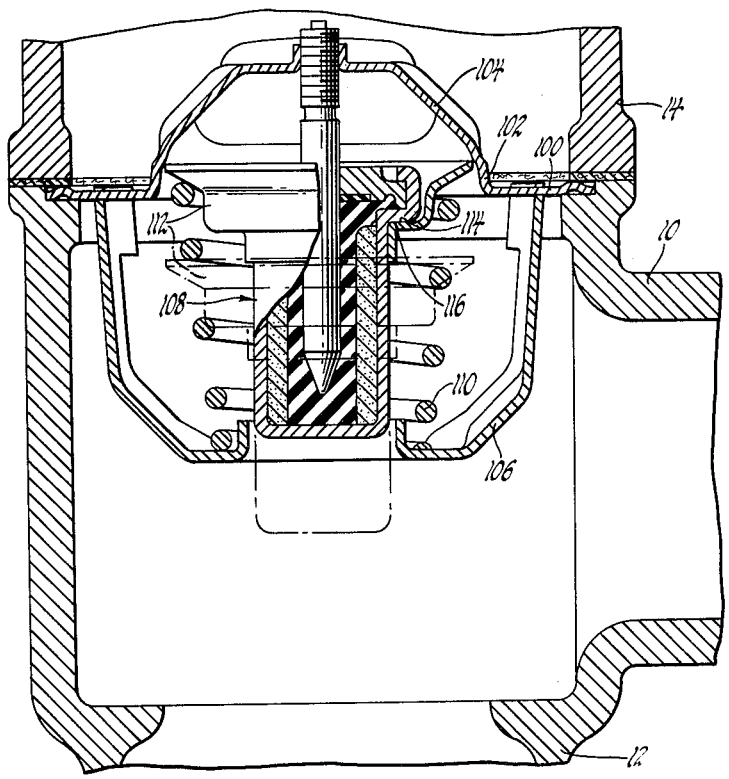
Figure 5:
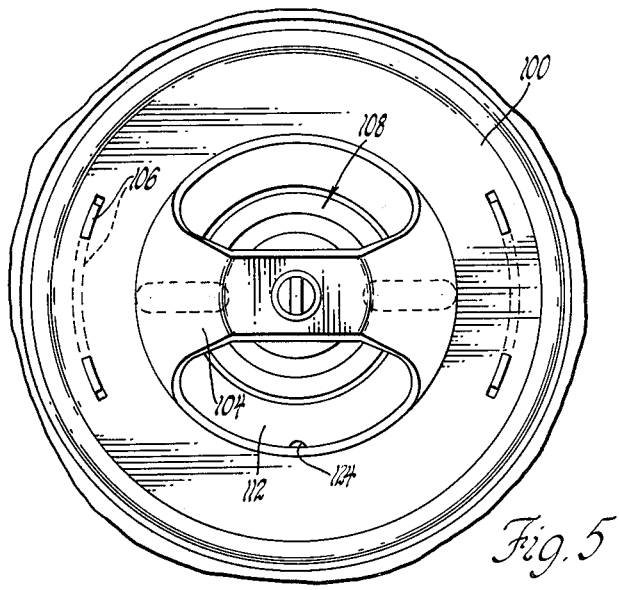
Figure 6:
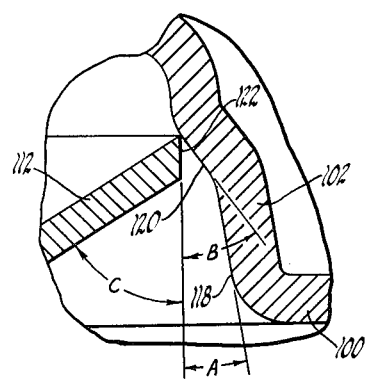

In the drawings:
FIGURE 1 is a sectional view through a portion of a duct system in which a thermostat embodying the present invention and having two coaxial and tapering throats is installed;
FIGURE 2 is a plan view of the thermostat shown in FIGURE 1 with the upper conduit of the duct system removed;
FIGURE 3 is an enlarged sectional view showing the seating or engaging portions of the thermostat frame and a valve determining a tapered throat or main flow opening; and
FIGURE 4 is a view similar to that of FIGURE 1 but showing a modified thermostat characterized by having a single tapered throat;
FIGURE 5 is a plan view of the thermostat shown in FIGURE 4; and
FIGURE 6 is an enlarged sectional view showing the tapered throat of the thermostat of FIGURES 4 and 5.

The duct system of FIGURE 1 illustrates a junction of conduits 10 and 12 through which engine coolant for an automobile may be recirculated through the engine jacket to the exclusion of the radiator when the engine is cold. Communicating with this junction is a conduit 14 which leads to the upper part of a radiator as is conventional. After the engine becomes heated, the flow of engine coolant will then be from the conduit 10 and upwardly through the conduit 14 to the radiator. This normal flow to the radiator depends upon the controlling valve action of the thermostat generally indicated at 16.

The themostat 16 comprises a frame which includes an annular disk member 18 integral with a bridge structure 20. This bridge structure extends upwardly from an annular wall 22 and is apertured at 24 and 26 for the flow of fluid discharge by way of a circular port defined by the annular wall 22. The duct structure is recessed as at 27 for rentention of the peripheral margin of the disk 18 and a sealing washer 28 is retained between abutting surfaces of the duct members. This sealing washer also aids in tightly holding the thermostat 16 in postion. The frame of the thermostat also includes a depending U-shaped portion 30 which is apertured at 32 slidably to receive a motor casing 34 of a pellet type thermostat motor having two relatively moving parts. The casing 34 is one of these parts and the other part is a plunger 36 fixed as at 38 to the bridge 20. The casing 34 includes a wax composition 40 which expands when subjected to rising temperatures. This wax surrounds a rubber element 42 which slidably receives a tapered end of the plunger 36. The plunger is guided by a retainer 44 and the latter also serves to enclose the rubber element 42 and the wax compression 40 tightly within the casing 34. Further details regarding the pellet motor are not given herein as they are subject to variation without departing from the present invention but it suffices to say that, when the wax composition 40 is subjected to rising temperatures, it expands and causes the rubber 42 to effect partial ejection of the plunger 36 and thereby forcing the casing 34 and the retainer 44 downwardly and along the axis of the plunger. A coil spring 46 is retained by the frame and the upper end of the spring bears against a shoulder 48 formed on the pellet motor casing 34 urging the latter upwardly with respect to the plunger 36 when the thermostat is subjected to a lowered temperature. Each side of the depending portion 30 of the frame is apertured as shown at 50 to accommodate the flow of fluid through the thermostat.

Between the annular wall 22 of the frame and the motor casing 34 is retained a valve 52. This valve is adapted to seat within the wall 22 when urged to do so by the spring 46 acting against the motor casing 34 and, therefore, against the valve 52. The latter bears at least one port 54 which is located within the maximum diametrical dimension of the casing 34. The valve is centrally apertured as at 56 to receive and slide on a cylindrical portion of the retainer 44. The latter is flared outwardly as at 58 to form a stop thereby limiting the possible axial movement of the valve 52 with respect to the casing 34. A bleed hole 60 is formed in the valve 52 as is common in thermostats of the type herein considered.

The annular wall 22 has a main portion in the form of an internal frusto-conical surface 62 which diverges downwardly from the axis of the thermostat and upstream at an angle designated as the angle A in FIGURE 3. It merges with a frusto-conical surface 64 forming a valve seat and made at an angle B relative to the thermostat axis. The specific values of angles A and B which are preferred have been found to be about 8 and 30 degrees respectively. Angle A may be from 5 to 15 degrees and angle B may be within the range of 15 to 90 degrees. The metering effect obviously is most pronounced at the zone immediately adjacent the edge 71 or the flow restricting part of the valve whether the latter be partly or fully open. The two surfaces 62 and 64 represent the preferred combination of minimum and maximum taper (within the range of from 5 to 30 degrees) effective at the throat (the opening of which varies in size with movement of the valve) to meter the flow but these two surfaces may be at the same angle. The minor size surface 64 may, in fact, be changed solely to function as a valve seat and to lie in a plane normal (90 degrees) to the thermostat centerline in accordance with the heretofore stated operative range for angle B and it may be very narrow. If at 90 degrees, as stated, gritty substances may lodge thereon and may possibly prevent valve closure but such a valve seat is operable and satisfactory under some conditions. If the angle A or B were less than 5 degrees, there would be a strong possibility that the valve would jam in its seat although the desired metering effect would be pronounced. If the angle A is made to exceed 30 degrees than the metering effect would be negligible. The effective and main portion 62 of the wall surface of the throat facing the valve 52 should preferably come within the range of 15 to 30 degrees if optimum metering effect is to be achieved.

The valve 52 is provided with a frusto-conical outer surface 70 and an inner frusto-conical surface 72. The surface 72 cooperates with an upper rim portion of the pellet motor casing 34 to give an inner metering effect on fluid which may be permitted to pass between the valve 52 and the casing 54 for discharge through the conduit 14. The angle of the surface 72 with respect to the axis of a cooperative and cylindrical surface 73 on the motor should be an acute angle.

It has been found that thermostats of types heretofore used would delay opening due to pump pressure exerted on the underside of the valve. To eliminate this difficulty, the present valve 52 will first show its opening tendency by the casing 34 lowering and permitting a preliminary flow of fluid between the valve and the casing 34. This preliminary opening will be smoothly performed due to the metering effect attained by the cooperating and facing surfaces of the valve 52 and the pellet motor surface 73 forming the inner tapered throat. Due to the reduced effective area of the casing 34 as compared to the total area of the valve 52 the pump pressure effect in holding the valve closed is at a minimum and as a consequence the valve will move more smoothly and will gradually open as required. The flared out portion or stop 58 will bring about the opening of the valve after the partial relief of the pump pressure which may be exerted on the latter. As a consequence, the valve 52 will leave its seat on the wall 22 and gradually open and little or no hunting or cycling effect will be had. It will be obvious that the metering effect or avoidance of cycling is due to the fact that a given linear opening movement of the valve is accompanied by a smaller opening of the valve throat than would be the case if the angular throat surface range of 5 to 30 degrees were exceeded. The sliding relation and somewhat loose mounting of the valve 52 on the motor permits tilting of the valve and a proper engagement of the surface 64 when the valve is closed. Because of the metering effect realized, the wear of and strain on the thermostat parts are minimized so that initial calibration of the thermostat remains accurate.

In the modification of FIGURES 4, 5, and 6, the junction of conduits 10, 12, and 14 is again shown but with a single valve thermostat controlling the flow. In this case, a supporting flange 100 is used with an annular wall 102, bridge 104 and underframe 106. A two-part motor 108 of the pellet type is also employed but with a coil spring 110 acting directly against an annular valve 112 thereby tending to hold the valve closed and also to maintain a shoulder 114 of the valve in abutting relation to a facing shoulder 116 on the motor casing. If desired, the valve 112 and the motor casing may be rigidly fastened together as by welding.

In FIGURE 6, the wall 102 is shown as having two coaxial and intersecting or merging annular surface portions 118 and 120. The portion 118 is the larger and has an angularity (A) with respect to the axis of the thermostat which is smaller than that (B) of the portion 120. A surface 122 of the valve 112 is made cylindrical as is the surface 69 of FIGURE 3, but this is not material in view of the linear path of travel of the valve. The surface 118 is made larger than the surface 120 as the surface 118 must be most effective in metering the flow during the greatest path of travel of the valve. This is the preferred arrangement but the surface 118 could be at the same angle (B) as is the surface 120 and a satisfactory metering effect may be had if the angles A and B are made to fall within the ranges set forth for the valve of FIGURES 1, 2, and 3. A notch 124 (FIGURE 5) in the valve 112 is used as a bleed hole.

I claim:

1. A thermostatic valve comprising a frame adapted to be mounted in a conduit, said frame having an annular wall defining a port with an inlet side and an outlet side, a thermostatic motor extending through said port and having two relatively movable parts, one of said parts being fixed to the fluid outlet side of said frame, the other of said parts being movable at the fluid inlet side of said port with respect to said frame, spring means urging said other part toward said port, an annular valve retained between said annular wall and said other motor part and being adapted to be moved by said spring means and motor to engage said annular wall to close said port and to withdraw from said annular wall to open said port, the said annular wall having merging frusto-conical surfaces diverging from the axis of said port upstream from the latter, and one of said surfaces being narrow to serve as a valve seat and the other of said surfaces being wide and at an angle within the range of from 5 to 15 degrees with the said axis.

2. A thermostatic valve as set forth in claim 1 in which said annular valve is axially movable on said movable motor part and has a port of smaller diameter than the latter to serve as a preliminary discharge port from between said movable motor part and said valve.

3. A thermostatic valve comprising a frame adapted to be mounted in a conduit, said frame having an annular wall defining a port, a thermostatic motor extending through said port and having two relatively movable parts one of which is fixed to the frame, a circular valve movable with the other part of said motor along the axis of said port to open the latter, spring means on one side of said circular valve and urging the latter and other motor part toward said port to close the latter, the said annular wall having a frusto-conical surface diverging from close up to said circular valve and at said one side at an angle of from 5 to 15 degrees with the said axis.

References Cited by the Examiner

UNITED STATES PATENTS

| | | | |
|---|---|---|---|
| 1,800,127 | 4/31 | Wilson | 251—334 |
| 2,330,881 | 10/43 | Gora | 251—334 |
| 2,857,105 | 10/58 | Drapeau | 236—34 |
| 2,926,853 | 3/60 | Wood | 236—34 |
| 2,927,737 | 3/60 | Zeuch et al. | 251—333 |
| 3,045,918 | 7/62 | Woods | 236—34 |

FOREIGN PATENTS

| | | |
|---|---|---|
| 159,275 | 10/54 | Australia. |
| 356,636 | 10/61 | Switzerland. |

EDWARD J. MICHAEL, *Primary Examiner.*